(12) United States Patent
Kopp et al.

(10) Patent No.: US 11,272,435 B2
(45) Date of Patent: Mar. 8, 2022

(54) METHOD FOR UPDATING A LIST OF STATIONS THAT CAN BE RECEIVED BY A RADIO RECEIVER SYSTEM

(71) Applicants: CONTINENTAL AUTOMOTIVE FRANCE, Toulouse (FR); CONTINENTAL AUTOMOTIVE GmbH, Hannover (DE)

(72) Inventors: Emmanuel Kopp, Guyancourt (FR); David Lefrançois, Levainville (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 187 days.

(21) Appl. No.: 16/644,296

(22) PCT Filed: Sep. 4, 2018

(86) PCT No.: PCT/FR2018/052155
§ 371 (c)(1),
(2) Date: Mar. 4, 2020

(87) PCT Pub. No.: WO2019/048770
PCT Pub. Date: Mar. 14, 2019

(65) Prior Publication Data
US 2021/0068040 A1    Mar. 4, 2021

(30) Foreign Application Priority Data
Sep. 5, 2017 (FR) ...................................... 1758176

(51) Int. Cl.
*H04W 48/16*    (2009.01)
*H04W 28/08*    (2009.01)
(Continued)

(52) U.S. Cl.
CPC .............. *H04W 48/16* (2013.01); *H04B 1/18* (2013.01); *H04H 60/64* (2013.01);
(Continued)

(58) Field of Classification Search
CPC ..... H04W 48/00; H04W 48/16; H04W 72/08; H04W 72/085; H04W 28/095;
(Continued)

(56) References Cited

U.S. PATENT DOCUMENTS

| 4,726,073 A | * | 2/1988 | Sessink | ............... | H04B 1/1027 |
| | | | | | 455/205 |
| 4,926,498 A | * | 5/1990 | Suzuki | ................ | H04B 7/0817 |
| | | | | | 455/133 |

(Continued)

FOREIGN PATENT DOCUMENTS

| CN | 1128590 A | 8/1996 |
| CN | 1795687 A | 6/2006 |

(Continued)

OTHER PUBLICATIONS

International Search Report, dated Nov. 28, 2018, from corresponding PCT application No. PCT/FR2018/052155.

*Primary Examiner* — Warner Wong
(74) *Attorney, Agent, or Firm* — Nixon & Vanderhye

(57) ABSTRACT

Disclosed is a method for updating a list of radio stations that can be received by a receiver system including at least two radio receivers, the method including: •determining a list of radio stations that can be received at a given instant, •measuring the quality of a current radio signal, corresponding to a frequency selected and listened to, •determining the ageing of the list of receivable radio stations, •comparing the quality with a configurable threshold that can be upgraded at least as a function of the ageing of the list, •if the quality exceeds the configurable threshold, deactivating the phase (Continued)

diversity filtering function and evaluating the change in the quality of the received signals and, •as a function of the evaluation:—automatically updating, or—keeping unchanged the list of receivable radio stations.

20 Claims, 1 Drawing Sheet

(51) Int. Cl.
*H04B 1/18* (2006.01)
*H04H 60/64* (2008.01)
*H04W 72/08* (2009.01)
*H04B 1/10* (2006.01)
*H04B 10/61* (2013.01)

(52) U.S. Cl.
CPC ....... *H04W 28/095* (2020.05); *H04W 72/085* (2013.01); *H04B 1/1081* (2013.01); *H04B 10/613* (2013.01)

(58) Field of Classification Search
CPC ......... H04W 28/0925; H04W 56/0035; H04B 1/16; H04B 1/18; H04B 10/548; H04B 10/613; H04B 1/10; H04B 1/1027; H04B 1/1081; H04H 60/61; H04H 60/64
See application file for complete search history.

(56) References Cited

U.S. PATENT DOCUMENTS

| | | | | |
|---|---|---|---|---|
| 5,204,979 A * | 4/1993 | Schenkyr | ............. | H04B 7/0842 455/276.1 |
| 5,345,600 A | 9/1994 | Davidson | | |
| 5,517,686 A * | 5/1996 | Kennedy | ................ | H04B 1/126 455/273 |
| 5,603,107 A * | 2/1997 | Gottfried | ............. | H04B 7/0814 455/133 |
| 6,611,677 B1 * | 8/2003 | Lindenmeier | ........ | H04B 7/0808 455/135 |
| 6,622,013 B1 * | 9/2003 | Miyoshi | ................ | H04B 7/086 455/273 |
| 6,940,932 B2 * | 9/2005 | Henriksson | .......... | H04B 7/0848 375/347 |
| 7,146,134 B2 * | 12/2006 | Moon | .................. | H04B 7/0811 455/67.11 |
| 7,590,399 B2 * | 9/2009 | Shatara | ................ | H04B 7/0802 455/272 |
| 7,720,184 B2 * | 5/2010 | Shatara | ................ | H04B 7/0857 375/347 |
| 7,929,921 B2 * | 4/2011 | Love | .................. | H04W 52/0245 455/101 |
| 7,936,852 B2 * | 5/2011 | Lindenmeier | .......... | H04B 7/084 375/347 |
| 2001/0016478 A1 * | 8/2001 | Lindenmeier | ........ | H04B 7/0874 455/277.1 |
| 2004/0198274 A1 * | 10/2004 | Lindenmeier | ........ | H04B 7/0805 455/130 |
| 2004/0253955 A1 | 12/2004 | Love et al. | | |
| 2007/0058761 A1 | 3/2007 | Lindenmeier | | |
| 2007/0140389 A1 * | 6/2007 | Lindenmeier | .......... | H04B 7/084 375/347 |
| 2008/0051046 A1 | 2/2008 | Ruckriem | | |
| 2009/0027562 A1 | 1/2009 | Arroyo | | |
| 2009/0191831 A1 | 7/2009 | Sasaki et al. | | |
| 2009/0197554 A1 * | 8/2009 | Shi | ....................... | H04B 1/1036 455/226.2 |
| 2009/0270058 A1 * | 10/2009 | Cheng | .................... | H04H 20/26 455/179.1 |
| 2012/0149318 A1 * | 6/2012 | Nakayama | ........... | H04B 1/0007 455/158.2 |
| 2013/0309978 A1 | 11/2013 | Weng | | |
| 2018/0006800 A1 * | 1/2018 | Su | ............................ | H03D 3/06 |

FOREIGN PATENT DOCUMENTS

| | | | |
|---|---|---|---|
| CN | 1933358 A | 3/2007 | |
| CN | 101248591 A | 8/2008 | |
| CN | 101369838 A | 2/2009 | |
| CN | 101416420 A | 4/2009 | |
| CN | 101795151 A | 8/2010 | |
| CN | 106301518 A | 1/2017 | |
| EP | 2884680 A1 | 6/2015 | |
| JP | 2285024 | * 2/2011 | ............. H04H 20/55 |

* cited by examiner

METHOD FOR UPDATING A LIST OF STATIONS THAT CAN BE RECEIVED BY A RADIO RECEIVER SYSTEM

BACKGROUND OF THE INVENTION

Field of the Invention

The invention relates to the field of radio receivers, especially those located on-board vehicles.

More precisely, the present invention relates to a method for updating a list of radio stations receivable by a radio receiving system having at least two radio receivers and two antennas.

Description of the Related Art

As is known, a radio receiver, especially in a multimedia system of a motor vehicle, is able to receive a radio signal, in particular an FM radio signal, FM being the acronym of "frequency modulation".

Such an FM radio signal, received in modulated form by a radio receiver, is subjected to various sensors and to suitable filtering so that the corresponding demodulated radio signal is able to be played back under good conditions, especially in the passenger compartment of a motor vehicle.

Those skilled in the art know the operating principle of an FM, that is to say frequency-modulated, radio signal received by a suitable radio receiver, with a view to being demodulated and then played back to listeners.

A known problem that relates to the reception of an FM radio signal via a mobile radio receiver, in particular one incorporated into a motor vehicle, resides in the fact that the FM radio signal emitted by an emitter may be reflected by natural obstacles or buildings for example, before being received by an antenna of the radio receiver. In other words, the emitted radio signal, before being received by an antenna of the receiver, may have followed various paths, of relatively long or short length. The emitted signal may furthermore, because of masking, not be received at all by the antenna of the radio receiver.

As a result thereof a selectivity is necessary, because a given radio signal may be received by one antenna several times, with various time shifts. This problem is known to those skilled in the art, who generally refer to it as "multipath".

In addition, to mitigate the aforementioned drawbacks relating to multipath and masking, it is known to equip radio receivers with at least two separate antennas that are said to create "phase diversity".

Phase-diversity systems comprising two antennas are one known solution to the problem of generating frequency selectivity with a view to processing interference due to multipath in motor-vehicle radio receivers.

Said principle consists in combining the FM radio signals received by two separate antennas of a radio receiver, in order to make, virtually, the assembly formed by said two antennas directional, in order to privilege a desired radio signal reaching the antenna array at a certain angle, to the detriment of an undesired radio signal reaching the antenna array at a different angle.

At the present time, most receiving systems, especially those located on-board vehicles, thus comprise at least two radio receivers—also referred to as "tuners"—that are able to receive, via a respective antenna, a given radio signal independently.

These receiving systems comprise, as explained in detail above, means for combining the radio signals received by said at least two receivers so as to form an optimal multiplexed radio signal from which signals resulting from multipath are in particular removed.

This function for combining signals received by two independent radio receivers so as to reconstruct an optimal combined radio signal in order, especially, to filter interference due to multipath therefrom, may be designated by the technical name "phase-diversity" filtering and will be thus designated below.

At the present time, phase-diversity filtering is implemented by means of a dynamic algorithm that is activated or not depending on data generated by sensors that measure physical attributes of the received radio signals. It is in particular a question of sensors of noise, of level and of multipath. In other words, phase-diversity filtering combines two physical radio receivers into one logical radio receiver, in order to limit perturbations in particular related to multipath.

In the prior art, when phase-diversity filtering is activated, the list of the receivable radio stations cannot be updated in the background, because this update requires the frequency band to be scanned, and a radio receiver is thus monopolized for this task, this being incompatible with the implementation of the dynamic phase-diversity filtering algorithm, which requires both radio receivers.

In the prior art, generally, the update of the list of receivable radio stations is carried out manually, on explicit request by the user, who must then wait for the search and update to finish. In addition, this function may not be available in a receiving system comprising two radio receivers in the case where, as explained above, phase-diversity filtering is active.

One solution known to those skilled in the art consists in adding, to the radio receiving system, a third radio receiver dedicated to scanning the frequency band, especially in order to allow the list of receivable radio stations to be updated. However, this known solution requires the presence of a dedicated third radio receiver, this resulting in a substantial additional cost.

There is therefore a need for a method allowing timely automatic update of the list of receivable radio stations in a receiving system comprising two radio receivers and, moreover, able to perform a phase-diversity filtering function.

One objective of the invention is therefore to allow the list of the receivable radio stations to be updated even in the case of perturbed reception.

According to the invention, in a receiving system comprising two radio receivers, the phase-diversity filtering is implemented when it is necessary to combine the signals received by the two radio receivers with a view to improving the quality of the combined signal, but said phase-diversity filtering may be deactivated in order to allow the list of receivable stations to be updated.

According to the invention, the function for updating the list of receivable radio stations is thus automatically activated or inhibited depending, on the one hand, on the aging of said list of receivable radio stations and, on the other hand, on whether or not the quality of reception and its variation implies the need to use the phase-diversity filtering function.

To this end, one subject of the invention is a method for updating a list of radio stations receivable by a receiving system comprising at least two radio receivers each having at least one antenna, each of the radio receivers being able to receive a radio signal via said at least one respective antenna, said receiving system being able to implement a phase-diversity filtering function by combining the signals received by each of said radio receivers to form a combined radio signal, said method comprising:

determining a list of radio stations receivable at a given time, measuring the quality of a current radio signal, corresponding to a frequency selected and listened to, determining the aging of the list of receivable radio stations, corresponding to the time passed from the last determination of the list of receivable radio stations, comparing said quality of the current radio signal to a configurable threshold that varies at least as a function of the aging of the list of receivable radio stations, if the quality of the current radio signal exceeds the configurable threshold, deactivating the phase-diversity filtering function and evaluating the variation in the quality of the received signals, and, depending on said evaluation:
automatically updating, or
maintaining unchanged the list of receivable radio stations.

By virtue of the method according to the invention, even in a situation of perturbed reception or of high modulation, it is possible to update the list of receivable radio stations automatically, i.e. with no intervention on the part of the user and without waiting for an update during the turn-off of the system for example.

According to one embodiment, the method moreover comprises comparing the quality of the current radio signal to a minimum threshold lower than the configurable threshold and, if said quality is lower than the minimum threshold, inhibiting any update of the list of receivable radio stations.

Advantageously, the configurable threshold decreases as a function at least of the aging of the list of receivable radio stations.

Advantageously, the configurable threshold moreover varies as a function of the level of multipath in the current radio signal.

Advantageously, the configurable threshold moreover varies as a function of the level of noise in the current radio signal.

According to one embodiment, the evaluation of the variation in the quality of the received signals comprises the following substeps:

measuring the quality, at the current time, of at least one signal corresponding to a radio station belonging to the list of receivable radio stations, determining a deviation between the measured quality at the current time of said at least one signal and the quality of said at least one signal measured at a prior time, and, if the deviation between the quality measured at the current time and the quality measured at the prior time is larger than a predefined threshold, automatically updating the list of receivable radio stations.

According to one embodiment, the evaluation of the variation in the quality of the received signals is carried out on a subset of a preset number of received radio signals having the highest levels of reception.

According to one embodiment, the variation in the quality of the subset of a preset number of received radio signals having the highest levels of reception is evaluated in a rapid determination mode, i.e. a mode requiring less than 10 ms per quality measurement.

According to one embodiment, the method comprises, if the deviation between the qualities measured at the current time and the qualities measured at the prior time is not larger than a predefined threshold, dividing by two the aging of the list of receivable radio stations.

According to one embodiment, the method comprises, if the deviation between the qualities measured at the current time and the qualities measured at the prior time is not larger than a predefined threshold, resetting to 0 the aging of the list of receivable radio stations.

The present invention also relates to a motor-vehicle radio receiving system, comprising a computer configured to control at least two radio receivers each having at least one receiving antenna, in order to implement the method briefly described above.

The present invention also relates to a vehicle comprising such a radio receiving system.

BRIEF DESCRIPTION OF THE DRAWINGS

Other features and advantages of the invention will become apparent from the following description, which is given with reference to the appended figures.

DESCRIPTION OF THE PREFERRED EMBODIMENTS

The invention is envisioned mainly with a view to an implementation in a vehicle, especially a motor vehicle. However, the implementation of the invention in other contexts, in particular in any radio receiving system or in any multimedia system intended to display the names of a list of detected radio stations, is also targeted.

As was briefly described above, the invention mainly aims to allow the function for updating the list of radio stations receivable by an on-board receiving system comprising two radio receivers in a vehicle to be optimized without adversely affecting the effectiveness of the phase-diversity filtering function when the activation of the latter is necessary to restore the quality of the received radio signals.

In other words, the present invention allows the activation or the deactivation of the phase-diversity filtering function to be adjusted depending on an evaluation of the quality of the received radio signals and on the evaluation of the advantageousness of updating the list of receivable radio stations, said list possibly becoming obsolete as the vehicle moves about.

Figure 1:
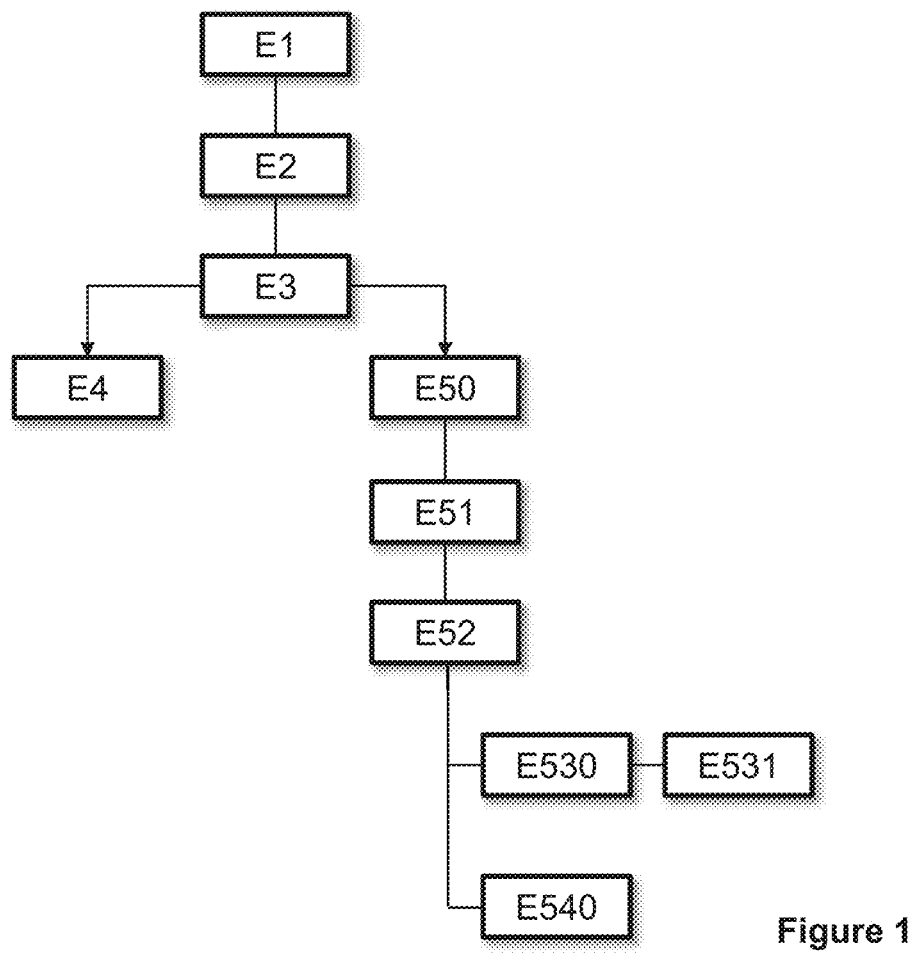
FIG. 1 shows the block diagram showing the steps of the method according to the invention

FIG. 1 shows a block diagram allowing the steps of the method according to the invention to be described.

In a radio receiving system, it is known to scan the frequency band in order to detect a list of receivable radio stations (step E1), i.e. a list corresponding to radio stations, transmitted at given frequencies belonging to the frequency band, for which the radio signal received is identifiable and audible. This known method for detecting a list of receivable radio stations is also designated "living band".

According to the invention, the date at which a last update of the list of receivable radio stations was carried out is stored in a memory of the system. The aging of the list, i.e. the time passed since the date of the last update, is computed. The procedure for updating the list of receivable radio stations (step E51), which requires the phase-diversity filtering function to be deactivated, is, according to the invention, permitted, inhibited or automatic depending on the quality of the received radio signals, on the aging of said list and on the variation in the qualities of the received radio signals.

The quality of the current received radio signal, i.e. that corresponding to the radio station the demodulated signal of which has been selected by the user who has chosen a frequency "to listen to" via an interface of the radio receiving system, with a view to playing it, is therefore regularly measured (step E2) by means of a sensor of level.

Figure 2:
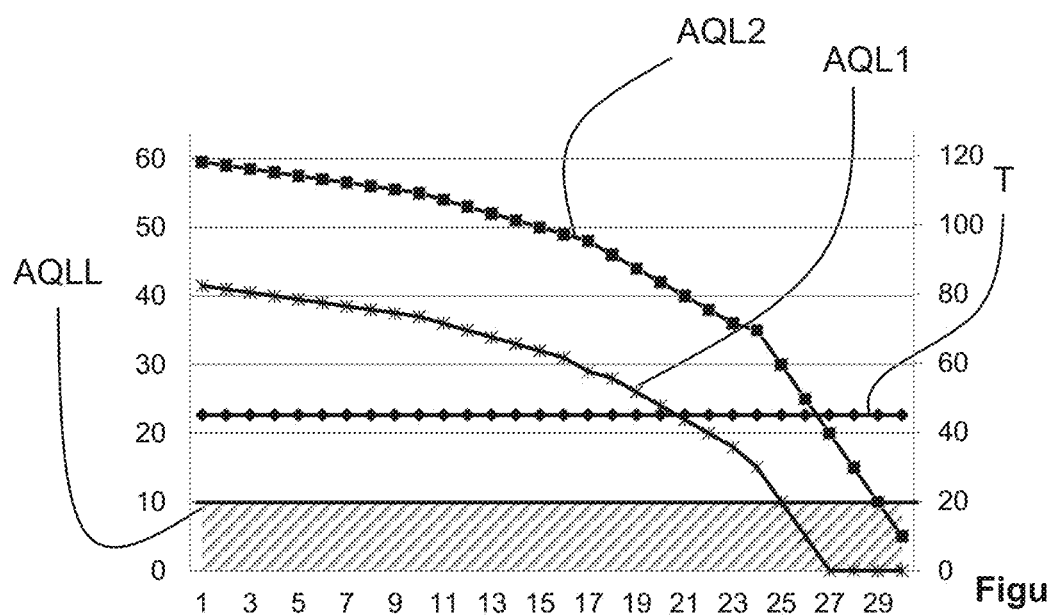
FIG. 2 shows a graph presenting the variation in criteria governing the activation or not of the phase-diversity filtering function and the update of the list of receivable radio stations.

With reference to FIG. 2, the curve AQLL represents an acceptable minimum level of quality of the received radio signal. This curve is configurable and corresponds to a level of quality below which the deactivation of the phase-diversity filtering function is not permitted. In other words, if the quality of the received radio signal is lower than the minimum level curve AQLL, the function for updating the list of receivable radio stations is inhibited.

On the x-axis of the graph of FIG. 2, the aging of the list of receivable radio stations, i.e. the time passed since the last update, such as stored in a memory of the system, has been plotted. In FIG. 2, the x-axis represents, more precisely, a temporal reference; each unit of the x-axis of FIG. 2 thus represents a length of time comprised between 1 minute and 5 minutes. The graph of FIG. 2 in its entirety therefore represents a maximum aging of 30 minutes to 150 minutes of the list of receivable radio stations.

Generally, according to the invention, the more recent the list of receivable radio stations, the higher the priority given to the quality of the radio signal will be and the higher the quality threshold from which the phase-diversity filtering function is activated will be.

Conversely, the older the list of receivable radio stations, the higher the priority given to updating said list will be, and the lower the quality threshold from which the phase-diversity filtering function is activated will be.

In other words, the higher the confidence in the relevancy of the list of receivable radio stations, because of the recency of said list, the more the method according to the invention will tend to "rapidly" activate the phase-diversity filtering. In contrast, the higher the likelihood that the list of receivable radio stations is obsolete, the more the method according to the invention will tend to delay activating the phase-diversity filtering.

To this end, with reference to FIG. 1, the method according to the invention makes provision, as indicated above, to measure the quality of the radio signal at the current frequency, or in other words at the frequency selected by the user via the interface of the radio receiving system (step E2).

The measured quality of the radio signal at the current frequency is analyzed (step E3).

Thus, if the measured quality of the radio signal at the current frequency is lower than the minimum threshold shown by the curve AQLL, the deactivation of the phase-diversity filtering function is forbidden (step E4). The list of receivable radio stations can therefore not be updated in this case.

If the measured quality is higher than the minimum threshold shown by the curve AQLL, the quality of the radio signal at the current frequency is compared (step E50) to a threshold for triggering the function for updating the list of receivable radio stations, the implementation of such an update involving deactivating the phase-diversity filtering. Said triggering threshold AQL1, AQL2 is itself defined by a function that varies, and that in particular decreases, as a function of the aging of the list of receivable and adjustable radio stations.

With reference to FIG. 2, the y-axis on the left represents the value of the triggering threshold of the function for updating the list of receivable radio stations. A plurality of adjustments of this threshold and of its variation over time are possible, defining various curves AQL1, AQL2 each corresponding to one profile of acceptable level of quality, that varies as a function of the aging of the list of receivable radio stations.

The y-axis on the right represents the value of the quality T of the current radio signal.

In the example of FIG. 2, it is assumed that a current radio signal has a constant quality T equal to 45 dBµV. Of course, the quality T of the current radio signal may vary over time.

Again with reference to FIG. 2, in the case where the chosen triggering-threshold profile corresponds to the first curve AQL1, the function for updating the list of receivable radio stations triggers (step 51) when the triggering threshold AQL1 is reached, which is after about 20 units of time.

In the case where the chosen triggering-threshold profile corresponds to the second curve AQL2, the function for updating the list of receivable radio stations triggers (step 51) when the triggering threshold AQL2 is reached, which is after about 27 units of time.

According to one embodiment, the triggering threshold of the function for updating the list of receivable radio stations (step 51) is moreover dependent on the level of multipath detected in the received radio signal, which is measured by means of a suitable sensor, also referred to as a multipath sensor.

According to one embodiment, the triggering threshold of the function for updating the list of receivable radio stations (step 51) is moreover dependent on the level of noise measured in the received radio signal, which is measured by means of a suitable sensor.

The triggering threshold of the function for updating the list of receivable radio stations thus defines an adjustable curve AQL1, AQL2 that varies as a function of the aging of the list of receivable radio stations and, where appropriate, especially as a function of the level of multipath and/or of the level of noise measured in the received radio signal.

The curves AQL1 and AQL2 show two examples of possible adjustments that may be parameterizable. A plurality of curves of this type may be used depending on customer requirements, and in particular depending on the place of use of the radio receiving system.

It will be noted that the first curve AQL1 and the second curve AQL2 are not necessarily linear and may contain jumps or breaks in slope depending on the chosen variation strategies.

According to one embodiment, the profile of the first and second curves AQL1, AQL2 is defined by means of a table of values that are obtained heuristically, and optionally adjusted depending on the results of experiments.

These adjustable triggering thresholds, which are shown in FIG. 2 by the curves AQL1 and AQL2, therefore vary as a function of the aging of the list of receivable radio stations and, where appropriate, of the level of multipath or of noise measured in the current received radio signal. In particular, these triggering thresholds decrease with the aging of the list of receivable radio stations. When the quality T of the current radio signal reaches the triggering threshold defined by the curve AQL1, AQL2, the phase-diversity filtering is deactivated (step 51).

According to the invention, for the function for updating the list of receivable radio stations (step 51) to be triggered the phase-diversity filtering function must be deactivated temporarily.

Specifically, then, the method according to the invention comprises evaluating the variation in the quality of at least one received radio signal (step 52) corresponding to a radio station present in the list of receivable radio stations. Preferably, the variation in the quality of a preset number of strong received radio signals corresponding to radio stations belonging to said list, for example the ten received radio signals that are strongest, i.e. that have the highest levels of reception, is evaluated.

To this end, the quality of said at least one radio signal corresponding to a radio station present in the list of receivable radio stations is measured, preferably in "flash" mode, i.e. using a rapid measurement method selected by a person skilled in the art. Such a measurement of quality carried out in flash mode requires the phase-diversity filtering function to be suspended for a few milliseconds, typically 7 ms, this being inaudible to the user. This measurement of quality is compared to a prior measurement of the quality of the radio signal corresponding to the same station carried out at a prior time and stored in memory.

If the deviation in quality observed between the prior measurement and the new measurement of the quality of the received radio signal corresponding to the same at least one station is larger than a preset threshold chosen by a person skilled in the art, this means that the context of reception has changed and this justifies an update of the complete list of receivable radio stations. To this end, the phase-diversity filtering function remains deactivated (step 530) and one of the radio receivers is dedicated to a scan of the frequency band to determine a new list of receivable radio stations (step 531). According to the invention, this update of the list of receivable radio stations is automatic.

If, in contrast, the deviation in quality observed between the prior measurement and the new measurement of the quality of the received radio signal corresponding to the same at least one station is smaller than the preset threshold, this means that the list of receivable radio stations is still relevant. The phase-diversity filtering function is in this case no longer deactivated (step 540). Moreover, according to one embodiment, the aging of the list of receivable radio stations such as stored in a memory of the system is furthermore forced to a lower value; for example said aging is divided by two or reset to 0.

It is furthermore specified that the present invention is not limited to the examples described above, and is open to variants that will appear obvious to those skilled in the art.

The invention claimed is:

1. A method for updating a list of radio stations receivable by a receiving system comprising at least two radio receivers each having at least one antenna, each of the radio receivers being able to receive a radio signal via said at least one respective antenna, said receiving system being able to implement a phase-diversity filtering function by combining the signals received by each of said radio receivers to form a combined radio signal, said method comprising:
   determining (E1) a list of radio stations receivable at a given time,
   measuring (E2) the quality of a current radio signal, corresponding to a frequency selected and listened to,
   determining the aging of the list of receivable radio stations, corresponding to the time passed from the last determination of the list of receivable radio stations,
   comparing said quality of the current radio signal to a configurable threshold that varies at least as a function of the aging of the list of receivable radio stations,
   if the quality of the current radio signal exceeds the configurable threshold, deactivating (E530) the phase-diversity filtering function and evaluating (E52) the variation in the quality of the received signals, and,
   depending on said evaluation (E52) of the variation in the quality of the received signals:
      automatically updating (E531), or
      maintaining unchanged (E540) the list of receivable radio stations.

2. The method as claimed in claim 1, moreover comprising comparing (E3) the quality of the current radio signal to a minimum threshold (AQLL) lower than the configurable threshold (AQL1, AQL2) and, if said quality is lower than the minimum threshold (AQLL), inhibiting (E4) any update of the list of receivable radio stations.

3. The method as claimed in claim 1, wherein the configurable threshold (AQL1, AQL2) decreases as a function at least of the aging of the list of receivable radio stations.

4. The method as claimed in claim 3, wherein the configurable threshold (AQL1, AQL2) moreover varies as a function of the level of multipath in the current radio signal.

5. The method as claimed in claim 4, wherein the configurable threshold (AQL1, AQL2) moreover varies as a function of the level of noise in the current radio signal.

6. The method as claimed in claim 1, wherein the evaluation (E52) of the variation in the quality of the received signals comprises the following substeps:
   measuring the quality, at the current time, of at least one signal corresponding to a radio station belonging to the list of receivable radio stations,
   determining a deviation between the measured quality of said at least one signal and the quality of said at least one signal at a prior time, and,
   if the deviation between the quality measured at the current time and the quality measured at the prior time is larger than a predefined threshold, automatically updating the list of receivable radio stations.

7. The method as claimed in claim 6, wherein the evaluation (E52) of the variation in the quality of the received signals is carried out on a subset of a preset number of received radio signals having the highest levels of reception.

8. The method as claimed in claim 7, wherein the variation in the quality of the subset of a preset number of received radio signals having the highest levels of reception is evaluated (E52) in a rapid determination mode, i.e. a mode requiring less than 10 ms per quality measurement.

9. The method as claimed in claim 6, comprising, if the deviation between the qualities measured at the current time and the qualities measured at the prior time is not larger than a predefined threshold, dividing by two the aging of the list of receivable radio stations.

10. The method as claimed in claim 6, comprising, if the deviation between the qualities measured at the current time and the qualities measured at the prior time is not larger than a predefined threshold, resetting to 0 the aging of the list of receivable radio stations.

11. A motor-vehicle radio receiving system, comprising a computer configured to control at least two radio receivers each having at least one receiving antenna, in order to implement the method as claimed in claim 1.

12. A vehicle comprising a radio receiving system as claimed in claim 11.

13. The method as claimed in claim 2, wherein the configurable threshold (AQL1, AQL2) decreases as a function at least of the aging of the list of receivable radio stations.

14. The method as claimed in claim 2, wherein the evaluation (E52) of the variation in the quality of the received signals comprises the following substeps:
measuring the quality, at the current time, of at least one signal corresponding to a radio station belonging to the list of receivable radio stations,
determining a deviation between the measured quality of said at least one signal and the quality of said at least one signal at a prior time, and,
if the deviation between the quality measured at the current time and the quality measured at the prior time is larger than a predefined threshold, automatically updating the list of receivable radio stations.

15. The method as claimed in claim 3, wherein the evaluation (E52) of the variation in the quality of the received signals comprises the following substeps:
measuring the quality, at the current time, of at least one signal corresponding to a radio station belonging to the list of receivable radio stations,
determining a deviation between the measured quality of said at least one signal and the quality of said at least one signal at a prior time, and,
if the deviation between the quality measured at the current time and the quality measured at the prior time is larger than a predefined threshold, automatically updating the list of receivable radio stations.

16. The method as claimed in claim 4, wherein the evaluation (E52) of the variation in the quality of the received signals comprises the following substeps:
measuring the quality, at the current time, of at least one signal corresponding to a radio station belonging to the list of receivable radio stations,
determining a deviation between the measured quality of said at least one signal and the quality of said at least one signal at a prior time, and,
if the deviation between the quality measured at the current time and the quality measured at the prior time is larger than a predefined threshold, automatically updating the list of receivable radio stations.

17. The method as claimed in claim 5, wherein the evaluation (E52) of the variation in the quality of the received signals comprises the following substeps:
measuring the quality, at the current time, of at least one signal corresponding to a radio station belonging to the list of receivable radio stations,
determining a deviation between the measured quality of said at least one signal and the quality of said at least one signal at a prior time, and,
if the deviation between the quality measured at the current time and the quality measured at the prior time is larger than a predefined threshold, automatically updating the list of receivable radio stations.

18. The method as claimed in claim 8, comprising, if the deviation between the qualities measured at the current time and the qualities measured at the prior time is not larger than a predefined threshold, dividing by two the aging of the list of receivable radio stations.

19. The method as claimed in claim 8, comprising, if the deviation between the qualities measured at the current time and the qualities measured at the prior time is not larger than a predefined threshold, resetting to 0 the aging of the list of receivable radio stations.

20. A motor-vehicle radio receiving system, comprising a computer configured to control at least two radio receivers each having at least one receiving antenna, in order to implement the method as claimed in claim 2.

* * * * *